Figure 1:
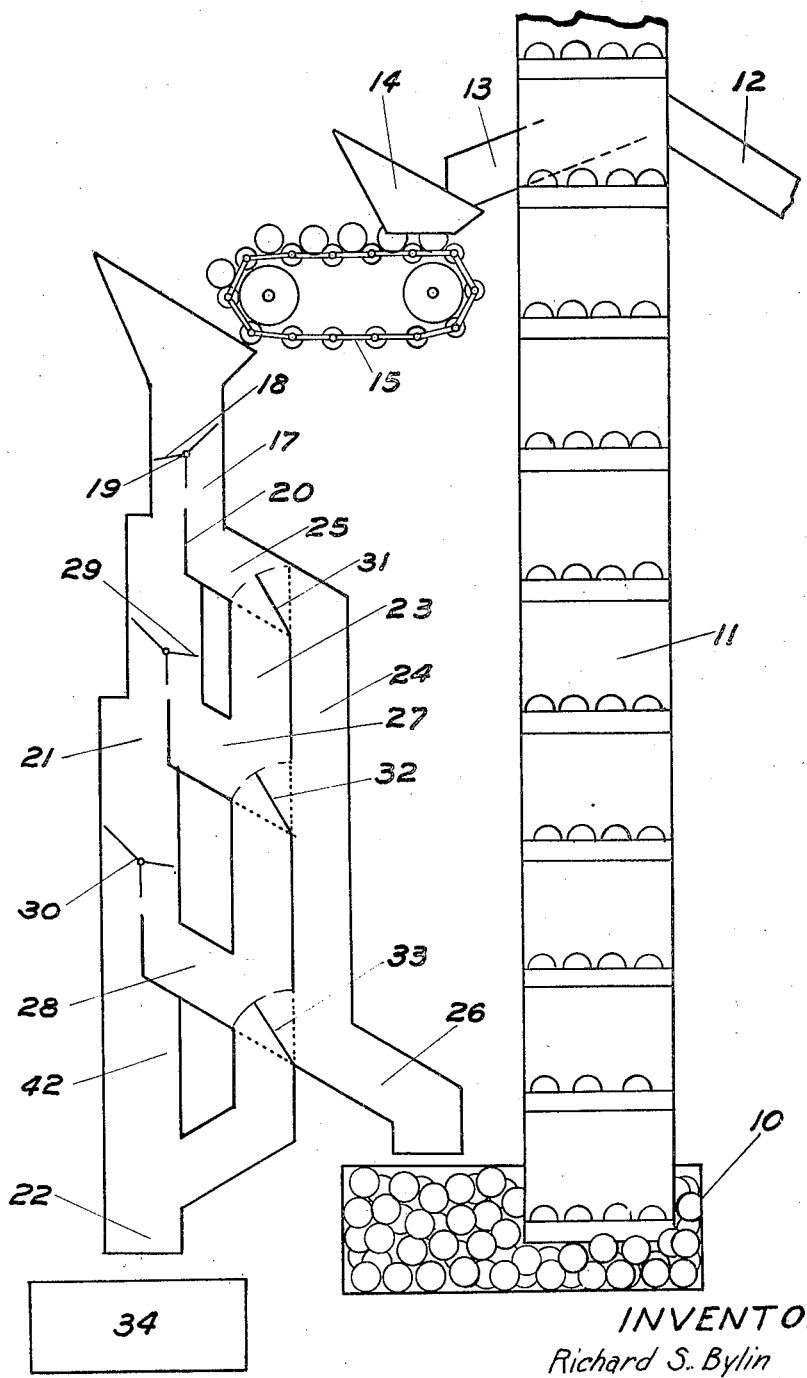

Feb. 21, 1950   R. S. BYLIN ET AL   2,498,601
SAMPLE TAKING DEVICE
Filed Jan. 19, 1946   2 Sheets-Sheet 1

INVENTORS
Richard S. Bylin
Harry H. Covington
Frederick F. Heydenfeldt by Robt E. Harris Attorney Feb. 21, 1950  R. S. BYLIN ET AL  2,498,601
SAMPLE TAKING DEVICE
Filed Jan. 19, 1946  2 Sheets-Sheet 2

INVENTORS
Richard S. Bylin
Harry H. Covington
Frederick F. Heydenfeldt
by Robert E Harris Attorney

UNITED STATES PATENT OFFICE 2,498,601

SAMPLE TAKING DEVICE

Richard S. Bylin, San Marino, Harry H. Covington, Alhambra, and Frederick F. Heydenfeldt, Los Angeles, Calif., assignors to California Fruit Growers Exchange, Los Angeles, Calif., a corporation of California Application January 19, 1946, Serial No. 642,370

9 Claims. (Cl. 73—421)

This invention relates to a device for segregating a certain percentage of articles from a group of articles being conveyed from one point to another. These articles are segregated at random and comprise a sample to be used to estimate the quality of the particular group of articles being conveyed.

More particularly, the invention relates to a device for taking a representative sample of citrus fruit from a shipment of this fruit received from from any particular grower so that the quality of his shipment may be determined.

In handling citrus fruit, the various growers may ship the fruit to a central point where the fruit is pooled. Before the fruit is placed in the pool, it is necessary to take a representative sample thereof in order to determine the quality of fruit deposited in the pool by each grower. The sample taken is then analyzed to determine the juice content and other factors which affect the value of the fruit. In this way the share of the proceeds to which each grower or shipper is entitled is determined.

The object of this invention is to provide a device which will automatically select from the fruit fed to the device a predetermined percentage thereof to be used as a representative sample.

Another object of the invention is to provide a device which is automatically operated by the weight of the fruit passing therethrough.

Figure 2:
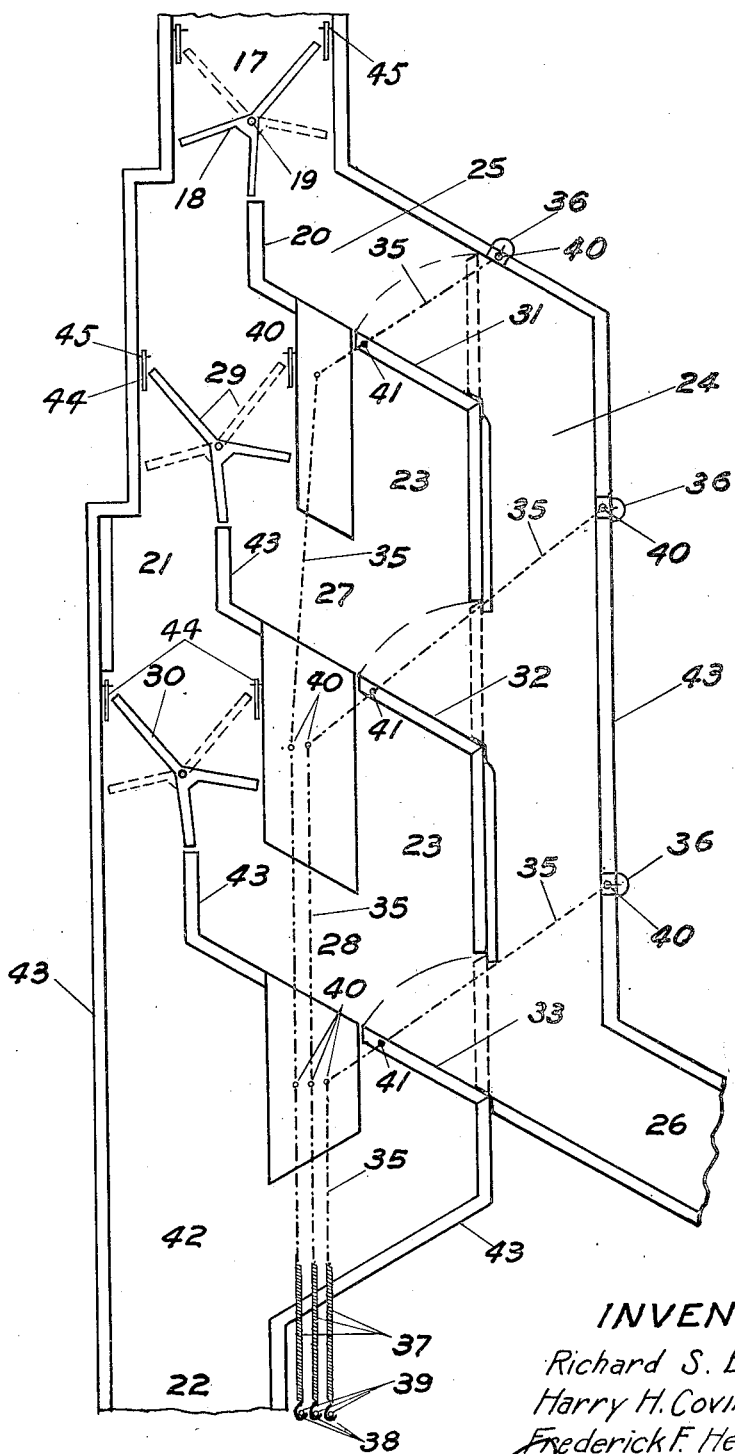

Other objects and advantages will be apparent in connection with the attached specification and in connection with the drawing in which:

Figure 1 is a diagrammatic showing of the device illustrating one arrangement thereof in connection with other apparatus; and Figure 2 is an auxiliary view or projection made on an auxiliary plane parallel to the inclined surface of the device.

The lot of fruit being delivered to the pool is dumped into a bin 10 from which it is conveyed by conveyor 11 to a chute 12 which delivers it to a storage bin (not shown) for storage along with other fruit for future use or processing. An arrangement which forms no part of this invention is provided at the top end of the conveyor 11 to divert some of the fruit being conveyed to a chute 13 which supplies hopper 14. The conveyor 15 which forms a bottom for the hopper 14 conveys the fruit, in single file, to inlet passageway 17 of the sample taking device.

Pivotally mounted in the passageway 17 at 19 is an inverted Y-shaped flipper 18 which is operated by the fruit contacting the same. The fruit will cause this flipper to pivot first to the right, then to the left, directing the fruit in the stream first to the right and then to the left. The fruit which is directed to the right will pass to the right partition wall 20 and that which is directed to the left will pass to the left of this wall. A primary channel 21 connects inlet passageway 17 with outlet passageway 22. Two other longitudinal channels, 23 and 24, are provided. These connect at their upper ends with a lateral channel 25 and at their lower ends with outlet passageways 22 and 26, respectively. Other lateral channels 27 and 28, connect primary channel 21 with secondary, longitudinal channels 23 and 24.

Additional inverted Y-shaped flippers 29 and 30 are pivoted in the primary channel and are arranged to direct fruit engaging the same either back to the primary channel or to one of the lateral channels, 27 and 28.

Buffer members 44 may be provided to limit movement of the flippers 18, 29 and 30 and prevent them from rebounding when they are pivoted from side to side by the fruit passing through the device. These buffers may be made of rubber belting or other suitable material and rectangular in shape. Hooks 45 are provided to support the buffers in the path of movement of the upper end of the flippers. The buffers are hung loosely on the hooks and each is spaced from the wall in which its supporting hook is secured. Two such buffers are provided for each flipper one to arrest the buffer on movement to the right and the other to arrest it on movement to the left. The flippers are often violently operated from side to side by the fruit, particularly when fruit of exceptionally large size is passing through the device. By supporting the buffers loosely on the hooks the energy of the pivoting flippers is effectively dissipated. Rebounding of the flippers is therefore prevented without in any way increasing the force necessary to operate the same.

Pivoted gates 31, 32 and 33 are arranged to be positioned to direct fruit travelling in the lateral channels either to the third longitudinal channel 23 or to the second longitudinal channel 24. The fruit directed into longitudinal channel 23 will be directed to outlet passageway 22 provided no gate below the point at which the fruit enters this longitudinal channel is in the down position. If any such gate is in down position it will direct the fruit to the second longitudinal channel 24. Fruit which once enters channel 24 will not be diverted and will be discharged through outlet 26. The fruit delivered from outlet passageway 22 drops into a sample box 34 whereas the fruit delivered from outlet passageway 26 is returned to the main bulk of fruit in hopper 10.

The gates 31, 32, and 33 are manipulated by means of cables 35. These cables are secured to each of the gates at 41 and are each provided with a weight 36 on one end and a spring 37 on the other end. The weights tend to move the gates to a vertical position as shown in dotted lines in Figure 2, in which position fruit travelling in any of the lateral channels will be directed to the third longitudinal channel 23.

If it is desired to secure gates 31, 32, and 33, in the position shown in full lines in Figure 2, hooks 38 are secured to members 39. In this position, fruit entering the lateral passageways 25, 27, and 28 will be directed to longitudinal channel 24 and thence to outlet 26. The springs 37 are provided in the cables 35 in order to hold the gates firmly in their full line position, as shown in Figure 2. A plurality of suitably located cable guides 40 are provided. These may be in the form of screw eyes and/or pulleys secured to the device at the desired points as indicated in Figure 2. The cable threads through the guides and is secured at 41 to each of the gates. With this arrangement of cables, it is possible to position selectively any one or all of the gates in a manner to direct fruit passing through lateral channels into either longitudinal channel 23 or 24.

The operation of the device is shown on the accompanying chart, which indicates the disposition of the articles when various gate positions are employed. It will be noted, for example, that in the first part of the chart one article is taken for use as a sample from every eight articles passing through the device. When the device is set for selecting articles for a sample in this ratio or proportion, it will be noted that gate 33 is in the down or full line position as shown in Figure 2 while gates 31 and 32 may be either up or down. Under the column "position of flippers" every combination of flipper position is indicated in the order in which it will occur in the operation of the device for one cycle. This cycle will repeat so long as articles are fed to the device and articles for use as a sample will continue to be taken in the ratio of one in eight. Should it be desirable to obtain a sample composed of articles in the ratio of one in four, gate 33 is placed in the up or dotted line position, as shown in Figure 2 gate 32 in the down position, and gate 31 in either position. When both gates 32 and 33 are in the up position, and gate 31 is in the down position articles will be taken to make up a representative sample, in the ratio of one in two. In other words, half of the fruit passing through the device will be diverted to the sample box.

| Position of Flippers | | | Position of Gates | | | Disp. of Art. | | Ratio of Articles taken as samples |
|---|---|---|---|---|---|---|---|---|
| 18 | 29 | 30 | 31 | 32 | 33 | Taken as a sample | Out ret'd to bin | |
| R | R | R | DU | DU | D | X | | 1 in 8 |
| L | L | L | DU | DU | D | | X | 1 in 8 |
| R | L | L | DU | DU | D | | X | 1 in 8 |
| L | R | L | DU | DU | D | | X | 1 in 8 |
| R | R | L | DU | DU | D | | X | 1 in 8 |
| L | L | R | DU | DU | D | | X | 1 in 8 |
| R | L | R | DU | DU | D | | X | 1 in 8 |
| L | R | R | DU | DU | D | | X | 1 in 8 |
| R | R | R | DU | D | U | X | | 1 in 4 |
| L | L | L | DU | D | U | | X | 1 in 4 |
| R | L | L | DU | D | U | | X | 1 in 4 |
| L | R | L | DU | D | U | | X | 1 in 4 |
| R | R | L | DU | D | U | X | | 1 in 4 |
| L | L | R | DU | D | U | | X | 1 in 4 |
| R | L | R | DU | D | U | | X | 1 in 4 |
| L | R | R | DU | D | U | | X | 1 in 4 |
| R | R | R | D | U | U | X | | 1 in 2 |
| L | L | L | D | U | U | | X | 1 in 2 |
| R | L | L | D | U | U | X | | 1 in 2 |
| L | R | L | D | U | U | | X | 1 in 2 |
| R | R | L | D | U | U | X | | 1 in 2 |
| L | L | R | D | U | U | | X | 1 in 2 |
| R | L | R | D | U | U | X | | 1 in 2 |
| L | R | R | D | U | U | | X | 1 in 2 |
| R | R | R | U | U | U | All gates up, no articles thrown out regardless of position of flippers. | | |

DU indicates gate may be either down or up.

If, for any reason, it is found desirable to direct all fruit entering the device to the sample box, all of the gates are placed in the up position so that all of the fruit will be directed to the sample box. This arrangement might be used to obtain a sample quickly, but such a sample if taken from only a portion of a load would obviously be less representative than when taken at a uniform rate from the entire load in the sampling operation.

In some instances where the load being delivered is small, the ratio of one in eight may not give a sufficiently large sample for performing the necessary laboratory tests. In this event, a larger percentage may be taken so as to provide a sufficient volume of fruit in the sample box for analysis purposes.

The device is constructed of a base member 42 to which is secured a series of walls 20 and 43, positioned as shown in Figure 2 to form longitudinal channels 21, 23, and 24 and lateral channels 25, 27, and 28 as well as inlet and outlet passageways 17, 22, and 26.

In the preferred embodiment shown in the drawings, and as we have preferred to use it in practice, the device is set with its open front facing upwardly and with the inlet 17 elevated above the outlet 22 sufficiently that the device as a whole is at an angle of about 45° with the horizontal. At this angle, fruit will flow through the device by gravity without falling out. In this preferred embodiment, a cover is not required or used. The device may, if desired, be set up at any angle sufficiently steep to assure gravity flow of fruit therethrough. If set up vertically, or at an angle so steep that the fruit would be likely to fall out, a cover may be provided to confine the fruit to the device.

While this sample taker has particular utility in connection with citrus fruit, particularly oranges and grapefruit, it may be employed for taking samples from batches or lots of other fruit, or articles, so long as they are of such shape that they will pass by gravity through the device.

We claim:

1. A sample taking device having an inlet and two outlets, article operated means pivoted in the inlet for alternately deflecting articles passing through the inlet to a longitudinal channel and a lateral channel, article operated means pivoted in said longitudinal channel for alternately deflecting articles travelling in said channel to the said channel and to a second lateral channel, a second article operated means pivoted in said longitudinal channel for alternately deflecting articles travelling in said channel to the said channel for delivery to one of the outlets and to a third lateral channel, and manually operable means adjacent each lateral channel for individually or collectively directing articles emerging from the respective channel to either one of the two outlets.

2. A device comprising a base, a plurality of walls secured to said base and forming in conjunction therewith an inlet passageway and two outlet passageways, other walls secured to the base intermediate the inlet and outlet passageways and forming a primary and two secondary longitudinal channels and three lateral channels, said primary channel being in line with and connecting the inlet and one of the outlet passages, means pivoted in said inlet to alternately deflect articles to said primary channel and one of said lateral channels, first and second pivoted means in the primary channel each alternately deflecting articles coming in contact therewith to the primary channel and one of the lateral channels, the secondary channels being connected one to each of the outlets and a plurality of pivoted gates each operable to direct articles from one of the lateral channels to either one of the secondary channels.

3. A device of the character described having an inlet and two outlets, a primary longitudinal channel through which articles are guided from the inlet to one of the outlets, a second longitudinal channel connected to the inlet and the primary channel by a series of lateral channels and through which articles are guided to the other of said outlets, a plurality of article operated means one being located at each junction of a lateral channel and the inlet and the primary channel, each means operating to divert alternate articles engaging the same to the primary channel and the remainder to a lateral channel, one wall of each lateral channel being provided with a manually operable pivoted gate adapted in one position to direct articles from said lateral channel to a third longitudinal channel intermediate the primary and second longitudinal channels and connected to said first mentioned outlet when the gates are all in said one position.

4. A sample taking device having an inlet and two outlets, a series of channels for guiding articles from the inlet to the outlets, an article operated flipper pivotally mounted in the inlet to intercept and route all articles, one half to one of said outlets and the other half to the other of said outlets, additional flippers located in the path of articles routed to the said one outlet and each operative to re-route one half of the articles engaging it to the other of said outlets, and a plurality of manually operable gates in the path of articles routed to said other outlet and operable to re-route articles originally directed to said other outlet, to said one outlet.

5. A device of the character described having an inlet and two outlets, a primary longitudinal channel through which articles are guided from the inlet to one of the outlets, a second longitudinal channel connected to the inlet and the primary channel by a plurality of sequentially arranged lateral channels and through which articles are guided to the other of said outlets, a plurality of articles operated flippers one being located at each junction of a lateral channel and the inlet and the primary channel, each flipper operating to route alternate articles engaging the same to the primary channel and the remainder to a lateral channel, a third longitudinal channel intermediate the primary and second channels connected to said one outlet and intersecting each lateral channel, and a manually operable gate at each intersection operable in one position to route articles passing through the intersection to the second longitudinal channel for delivery to said other outlet, and in another position to route the articles to the third longitudinal channel for delivery to one or the other of said outlets depending upon the position of subsequent gates in the sequence.

6. A device for diverting a definite percentage of articles from a stream of articles fed thereto, said device comprising a base, a plurality of walls secured thereto and forming in conjunction therewith an inlet passageway and two outlet passageways, other walls secured to said base and forming in conjunction therewith a plurality of longitudinal channels in communication with the inlet and said outlets, and a plurality of inverted Y-shaped flippers each pivoted to said base and located in one of said longitudinal channels in a position to be successively contacted by the articles in said stream, each article operating said flipper about its pivot to position the same for routing the next succeeding article to a channel other than the one to which the flipper operating article is destined.

7. A device of the character described having an inlet and two outlets, a primary longitudinal channel for guiding articles from the inlet to one of the outlets, a secondary longitudinal channel parallel to said primary channel and connected to the inlet and the primary channel by a series of lateral channels and through which articles are guided to the other of said outlets, and a plurality of inverted Y-shaped pivoted flippers mounted for movement about their pivots by articles engaging the same into a left position and a right position alternately, one flipper being located at the junction of one lateral channel and the inlet and one at each junction of each of the other lateral channels and the primary channel, each flipper in one position blocking the lateral channel adjacent thereto and routing articles traveling in the primary channel back to the primary channel for delivery to one of said outlets and in the other position blocking the primary channel and routing articles to its adjacent lateral channel for delivery to the other of said outlets.

8. A device for diverting a definite percentage of articles from a stream of articles fed thereto, said device having a base, a plurality of walls normal to the base and secured thereto and forming in conjunction therewith an inlet passageway, two outlet passageways, and channels connecting said passageways, a plurality of inverted Y-shaped flippers each pivoted on said base between a pair of said walls and located in the path of at least a portion of said articles and swingable about its pivot by articles contacting it into a left position and a right position alternately between said walls, and buffer means loosely suspended on and spaced from said walls adjacent each flipper in the path of movement thereof and engageable therewith to limit and arrest movement of the same and prevent rebound, each flipper in one position routing articles engaging the same to a channel leading to one of said outlets and in the other position routing articles engaging the same to a channel leading to the other of said outlets.

9. In a device of the class described comprising a plurality of channels for guiding a stream of articles therethrough, pivoted means located in one of said channels for operation by said stream of articles to divide said stream into a first selected and a first rejected group and directing said groups to separate channels, a second pivoted means located in the channel guiding said first selected group and operable by the articles in said group to divide the latter into a second selected group and a second rejected group, a third pivoted means mounted in the channel guiding said second selected group and operable by the articles therein to divide said group into a third selected and a third rejected group and direct said groups into different channels, and manually operable means for selectively returning at least one of said rejected groups to said third selected group to form the sample desired.

RICHARD S. BYLIN.
HARRY H. COVINGTON.
FREDERICK F. HEYDENFELDT.

REFERENCES CITED

The following references are of record in the file of this patent:

UNITED STATES PATENTS

| Number | Name | Date |
|---|---|---|
| 463,509 | Hawley | Nov. 17, 1891 |
| 840,943 | Ingold | Jan. 8, 1907 |
| 1,798,788 | Dyer | Mar. 31, 1931 |
| 1,875,472 | McGregor | Sept. 6, 1932 |
| 2,359,641 | Harlow | Oct. 3, 1944 |